Figure 1:
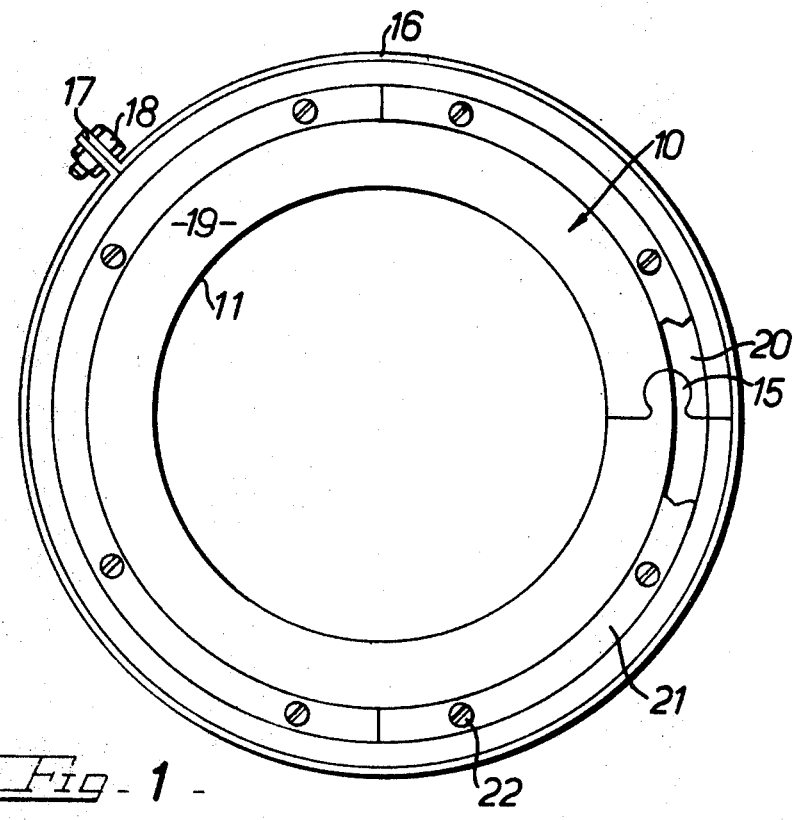

United States Patent

[11] 3,612,550

[72] Inventor Samuel C. W. Wilkinson
 Slough, England
[21] Appl. No. 14,358
[22] Filed Feb. 26, 1970
[45] Patented Oct. 12, 1971
[73] Assignee Crane Packing Limited
 Slough, England
[32] Priority Mar. 5, 1969
[33] Great Britain
[31] 11,653/69

[54] SHAFT SEALS
 4 Claims, 2 Drawing Figs.
[52] U.S. Cl. .................................................... 277/101
[51] Int. Cl. .................................................... F16j 15/24
[50] Field of Search .......................................... 277/101,
 84, 122, 38, 154, 206, 235 R

[56] References Cited
UNITED STATES PATENTS
| | | | |
|---|---|---|---|
| 1,011,671 | 12/1911 | Thompson | 277/122 |
| 1,038,759 | 9/1912 | Judd | 277/138 |
| 1,494,004 | 5/1924 | Mallory | 277/154 |
| Re. 23,782 | 2/1954 | Patterson | 277/235 |

Primary Examiner—Robert L. Smith
Attorney—Scrivener, Parker, Scrivener and Clarke ABSTRACT: In a shaft seal suitable for a marine stern tube comprising a ring of resilient material of which the end faces are provided with annular thrust bearing surfaces, to facilitate assembly or replacement the ring is split by a longitudinal cut providing shaped cut faces of interengaging form that seal together on radially outward pressure, the split ring is enclosed by reinforcing bands and the thrust bearings are segmented.

PATENTED OCT 12 1971 3,612,550

SHAFT SEALS

This invention relates to a shaft seal suitable for use in a marine stern tube and of the known kind comprising a ring of resilient material which is channel-shaped in cross section, with the flanges directed inwards, and with the end faces being provided with antifriction material, for instance an annulus of antifriction metal recessed into each end face. Such a shaft seal is herein referred to as of the kind specified.

A shaft seal of the kind specified when in use serves to prevent the escape of oil from around the propeller shaft. It is a well-proved and established design but it suffers from the drawback that it must be passed over the end of the shaft for installation or service.

An object of this invention is to eliminate this drawback by providing a shaft seal of the kind specified that is of split form.

Accordingly, this invention consists in a shaft seal of the kind specified wherein the ring is interrupted by a longitudinal cut and the ring is enclosed by reinforcing bands, the cut faces of the ring being interengaging and of a configuration such that radially outward pressure applied to the ring against the restraint of the bands seals the cut faces together.

In this invention the ring of resilient material is interrupted by a cut that extends longitudinally and which is not a plain radial cut but is shaped to have an interlocking form, for example a dovetail form, or a profile in which a rounded head on one cut face is received in a recess in the other.

The cross section of the cut is, for simplicity, uniform in an axial direction, i.e. through from one face of the ring to the other, and is radially far enough out to lie in the web rather than just the flanges of the channel-shaped resilient ring.

The ring is enclosed in two or more, preferably two, reinforcing bands of metal strip, the ends of each band being held together by tangentially extending bolts.

The use of the interengagement between the cut faces of the ring in combination with the reinforcing bands ensures that the ring is held together against the bursting pressure of the oil, and the configuration of the cut faces is such that the radially outward pressure of the oil exerts a force on the ring to seal the cut faces tightly together.

The provision of the two or more reinforcing bands allows the resilient ring to be axially compressed in service, this would not be the case if a continuous metal shroud or housing were fitted.

The annuli of antifriction material, usually a metal, provided in the end faces of the ring are divided into two or more arcuate segments and are received and mounted in recesses formed in the end faces of the ring. The segments may have plain radial or interengaging butting ends.

It will be appreciated that with the shaft seal according to this invention all of the parts are split in a direction extending axially in relation to the shaft with which the seal is used. Thus the shaft seal can be fitted without the necessity of sliding the seal over a free end of the shaft. This simplifies fitting to a very large extent, and also avoids the damage to the sealing faces of the resilient ring which may occur when the seal is slid along the shaft. The especial way in which shaft seal according to this invention is divided longitudinally does not interfere with the resistance to oil pressure, and in fact, an increase in oil pressure increases the sealing engagement of the interengaging cut faces of the resilient ring.

In addition, the wearing faces of the shaft seal are constituted by an inner annular face of resilient material, a metal insert which carries the bearing load and an outer annular face of resilient material, the inner and outer annular faces forming the seal. Such combined structure of the wearing face enables the use of split metal inserts to carry the bearing load without leakage from the seal. The inner and outer annular faces of the ring of resilient material perform their sealing function despite the cut through the ring as the cut faces are compressed together by the reinforcing bands.

Figure 2:
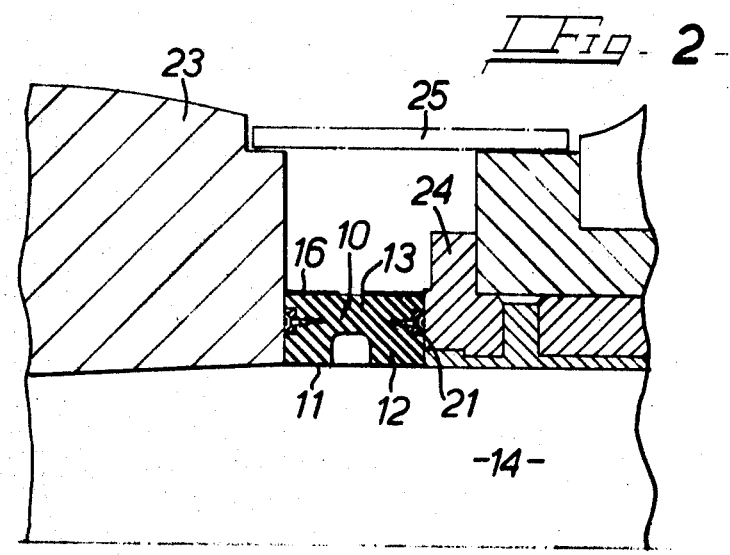

An embodiment of the invention will now be described with reference to the accompanying drawing wherein:

FIG. 1 is an axial view of a shaft seal with the annulus of antifriction material partly broken away; and FIG. 2 is a cross section of the shaft seal fitted to a stern tube housing with the cross section being radial and extending from the central longitudinal axis of the propeller shaft.

In the drawing the shaft seal includes a ring 10 of resilient, flexible material, commonly a rubber, ring 10 being of channel-shape having two limbs 11, 12 extending radially inwards from a web 13. As is shown in FIG. 2 the axial end faces of the limbs 11, 12 engage with the propeller shaft 14 to effect sealing.

The ring 10 is cut longitudinally so that one cut face is formed with a rounded head 15 which engages within a complementary recess formed in the other cut face. The cut faces of the ring 10 are thus interlocked.

The ring 10 is enclosed by two reinforcing bands 16 spaced axially apart and the ends 17 of each band 16 are connected together by tangentially extending bolts 18.

The opposed end faces 19 of the ring 10 are formed with a recess 20 in which arcuate segments 21 of bearing metal are secured by screws 22. The segments 21 provide thrust bearing surfaces for the propeller boss 23, the end of the stern tube 24 and its bearing liner 25 which are enclosed in a housing constructed in known manner. In known manner the arcuate segments 21 could be provided with oil grooves.

As will be appreciated by those familiar with this subject, in operation the oil pressure acts radially outwards against the ring 10. Such radial pressure will effectively force the cut faces into tight sealing engagement because radial expansion of the ring 10 is prevented by the reinforcing bands 16. Axial compression of the shaft seal due to axial thrust may be accommodated by the central part of the ring 10 which is not enclosed by the reinforcing bands 16.

The shaft seal can be fitted without removing the propeller to expose the free end of the shaft 14 as each part of the shaft seal can be assembled around the shaft 14 after the housing or cover 25 has been removed and sufficient axial clearance provided. The resilient ring 10 in the form of a length of flexible, profiled material may be wrapped around the shaft 14 and the end cut faces interengaged so that they are positively located. The arcuate segments are secured and the reinforcing bands tightened.

I claim:

1. In a shaft seal comprising a ring of resilient material channel-shaped in cross section having a web separating inwardly directed flanges and antifriction material provided at opposed end faces of said flanges, the improvement of interrupting said ring by a longitudinal cut of a configuration whereby portions of the cut faces interlockingly engage against radially outward pressure, and reinforcing bands enclose said ring.

2. A shaft seal as claimed in claim 1 wherein said longitudinal cut is uniform in an axial direction, and said interlocking portions of said cut faces lie in said web part of said ring.

3. A shaft seal as claimed in claim 2 wherein one said interlocking portion comprises a rounded head and the other said interlocking portion comprises a complementary recess.

4. A shaft seal as claimed in claim 3 wherein said antifriction material comprises arcuate segments mounted in recesses formed in said end faces of said ring.